Figures 1, 2:
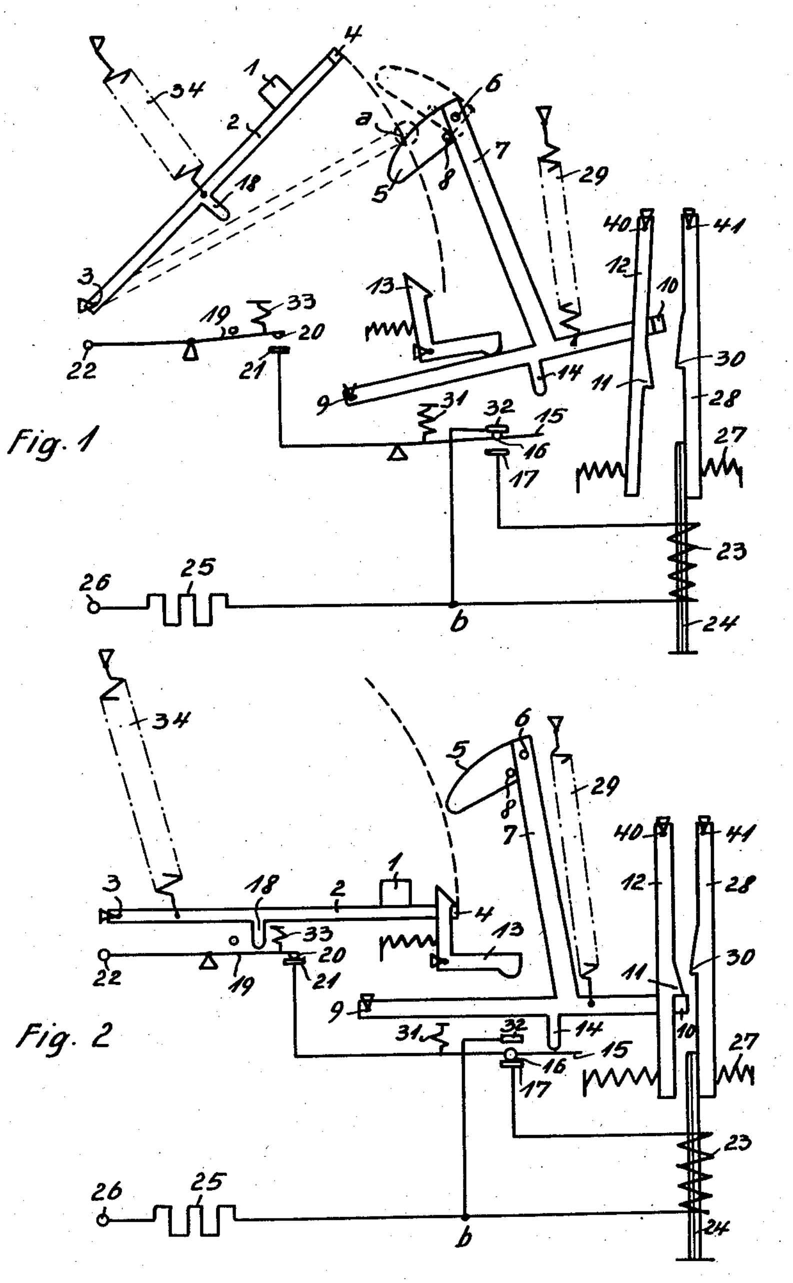

April 1, 1958 H. REMY 2,829,230

ELECTRIC TOASTER

Filed March 8, 1955 3 Sheets-Sheet 1

Inventor:
Hermann Remy
by:
Michael S. Striker agt.

April 1, 1958 H. REMY 2,829,230

ELECTRIC TOASTER

Filed March 8, 1955 3 Sheets-Sheet 2

Inventor:
Hermann Remy
by:
Michael S. Striker
agt.

Inventor:
Hermann Remy
by:
Michael S. Striker
agt.

United States Patent Office 2,829,230

Patented Apr. 1, 1958

1

2,829,230

ELECTRIC TOASTER

Hermann Remy, Niederrad, Frankfurt am Main, Germany, assignor to Rowenta Metallwarenfabrik, G. m. b. H., Offenbach (Main), Germany, a German body corporate Application March 8, 1955, Serial No. 492,945

Claims priority, application Germany March 25, 1954

11 Claims. (Cl. 219—19)

The invention relates to electric heating appliances, particularly to electric bread toasters, and the invention is concerned with an improvement of the automatic control mechanism with which such heating appliances usually are equipped. Such control mechanisms include as a rule a heat responsive member, e. g. a bimetal strip, which is heated by the working current and expands or bends when heated a certain time, and which by the expanding or bending movement actuates a switch for disconnecting the heating current.

However, the forces exerted by such a heat responsive member (thermostat) are comparatively small, therefore, usually a lever transmission is inserted between the thermostat and the switch, but it has been found that such a lever transmission is not reliable in service. It easily happens that jamming occurs, or in the case of a bread toaster wherein the discharge mechanism for the toasted bread is actuated together with the movement of the switch into its "off" position, it often happens that the bread slice bends and locks the lever mechanism. Also the possibility has to be considered that the main switch is held intentionally in its closed position for instance to prolong the toasting. In such cases the thermostat becomes overheated and as a consequence thereof its operating times are changed, which is of course undesirable.

It has been proposed to use electromagnets for moving the main switch into its "off" position and for discharging the toasted bread, and to use the thermostat only for switching in the energising current for the electromagnet. Although satisfactory in its operation, this arrangement is rather expensive to manufacture.

It is therefore the object of the present invention to devise a control mechanism for an electric heating appliance with a thermostat which indirectly actuates the main switch and the discharge device for the toasted bread, which control mechanism is simple in its design and inexpensive to manufacture, yet reliable in operation. And it is another object of the present invention to make the arrangement such that the indirectly acting thermostat, when heated to a predetermined and adjustable degree, causes an interruption of the main heating circuit or at least of its own heating circuit even if the main switch or the discharge device for the toasted bread locked in its movement.

Therefore, a control mechanism for an electric heating appliance, for instance a bread toasted, comprises main switching means, energy storage means, and latching means, a heating circuit including at least a pair of contacts which are normally open, a thermostat with a heating coil traversed by the heating current, and a heating element producing the useful heat, the arrangement being such that the said switching means, when moved into the "on" position, tension the energy storage means, that the energy storage means, when brought into the tensioned position, close the said contacts and become engaged and held in the tensioned position by the said latching means, and that the thermostat is so disposed that it releases the said latching means.

2

According to a preferred construction the control mechanism comprises (*a*) a heating circuit including a heating element producing useful heating and a thermostat with a heating coil, (*b*) a main switch lever associated with a restoring spring, and a main latch, the arrangement being such that by moving the main switch lever into the "on" position the said restoring spring is tensioned and the main switch lever is tripped by the latch, (*c*) an intermediate lever associated with a restoring spring, another latch and a normally open contact of the heating circuit, the said intermediate lever being so arranged with respect to the main switch lever that by the movement of the latter into its "on" position the intermediate lever is angularly displaced so that it tensions its restoring spring, closes the said contact, and is engaged by the latch, and (*d*) a thermostat which is heated by the working current and is so disposed with respect to the said other latch that, when heated, it deflects the said latch to release the intermediate lever.

Figure 3:
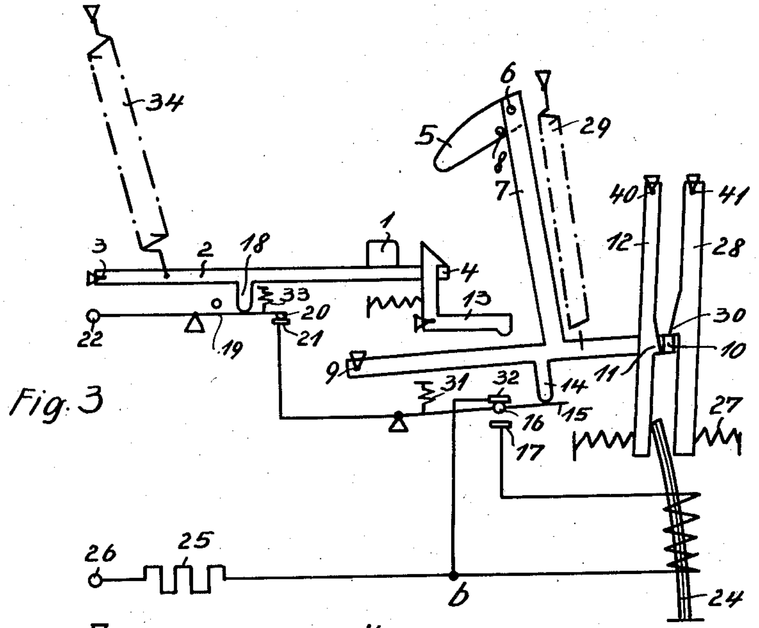
Figure 4:
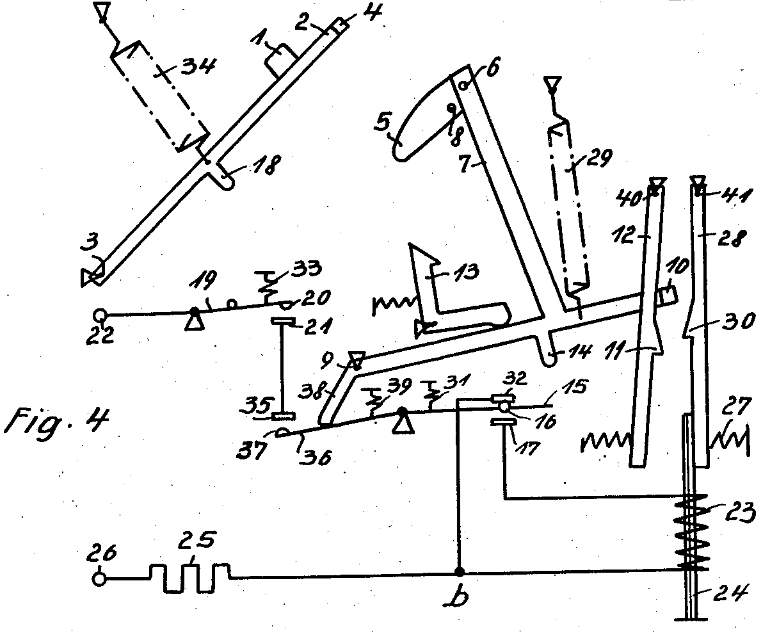
Figure 5:
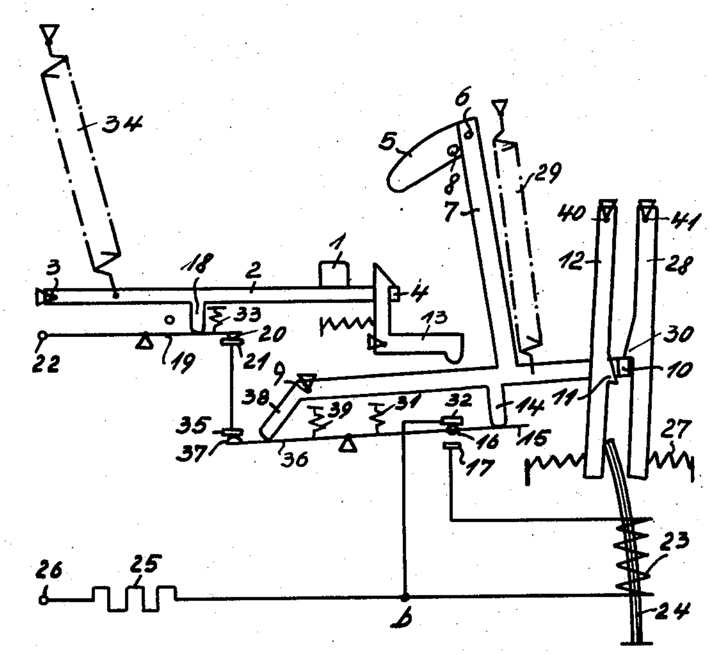

In order that the control mechanism according to the invention may be clearly understood and readily carried into practice, two embodiments thereof will now be described with reference to the accompanying drawings, wherein Figs. 1 to 3 represent schematically one construction in three different operational positions, whilst Figs. 4 and 5 represent a modified construction in two different operational positions. The same members have been designated in all representations by the same reference numerals.

As shown in Figs. 1 to 3, the heating circuit extends from the terminal 22, over a switch 19, another switch 16, a heating winding 23 of a bimetal strip 24, and the heating resistance element 25 to the other terminal 26. The switch 19 comprises two contacts 20 and 21, and is biased into its open position by a spring 33. The switch 15 is a change-over switch which has a normally closed contact 32, a normally open contact 17, and a movable contact 16, the latter being biased by a spring 31 into contact with contact 32. The contact 32 is connected to a point *b* between the heating resistance element 25 and the heating coil 23, thus forming with contact 16 a shunt or bridging connection in respect of the heating coil 23. The main lever 2, which is pivotally mounted about a pivot pin 3, has an operating button 1 and is biased into its open position by a spring 34. The lever 2 is provided with a projection arranged to engage the contact arm of the movable contact 20 so as to cause the movable contact 20 to contact the fixed contact 21 when the main lever is moved into its "on" position. The free end 4 of the main lever is turned over, and the turned over part is arranged to co-act with a main latch member 13, so that when the main lever 2 is depressed into its "on" position, it is engaged by the latch 13 and kept in the "on" position. Between the main lever 2 and the bimetal strip 24 an intermediate control lever 7 is disposed which is pivotally mounted about a pivot pin 9 and has one arm extending substantially in a horizontal direction and another arm branching off from the first mentioned arm and extending upwards. The intermediate control lever 7 is biased into its normal position by means of a restoring spring 29. The intermediate control lever carries at the end of its upwards extending arm a cam member 5 which is pivotally mounted by means of the pivot 6, and is provided with a stop pin 8; thus, the cam 5 is free to swing in a clockwise direction, but is prevented from rotating in the opposite direction. The control lever is also provided with a projection 14 arranged to operate the changeover switch 15. The lever 7 is so disposed with respect to the said main latch 13 for the main lever 2 that the control lever 7 trips the latch when it returns into its normal position. The free end of the horizontal arm of the intermediate lever 7 is turned over at 10, and the turned over part is arranged to be engaged either by the projection 11 of a latch member 12 pivotally mounted at 40, or by the projection 30 of a latch member 28 which is pivotally supported at 41. Both latch levers 12 and 28 are biased by springs into the positions where they engage the intermediate control lever 7, and they are so disposed with respect to the bimetal strip 24, that when the latter bends, it moves the latch lever 12 out of engagement with the intermediate lever 7 and allows the latch lever 28 to follow its movement, so that the latter lever moves into the path of the turned over part 10 of the intermediate control lever 7 whereby this lever becomes locked by the projection 30. When the bimetal strip returns into its original position, it causes the latch lever 28 to move backwards and to relase completely the intermediate lever 7 which then returns to its original position.

If the main lever 2 is depressed by means of its button 1, then this lever turns about its pivot 3 and its free end 4 engages the cam 5 at the point *a* and causes thereby the intermediate lever 7 to rotate in a clockwise direction until its turned over end 10 engages the projection 11 of the latch lever 12 and is locked in this position. At the same time the intermediate lever 7 has moved with its projection 14 the movable contact 16 of the change-over switch 15 into contact with the working contact 17. On its further movement downwards, the main lever engages the latch 13 and is locked by this latch in the "on" position. In this position the projection 18 of the main lever has closed the contacts 20 and 21.

The position of the individual members of the control mechanism after the main switch lever has been moved into the "on" position is indicated in Fig. 2. Now the current flows from the terminal 22 over the contacts 20, 21, the contacts 16, 32, winding 23, and then through the heating resistance 25 to the other terminal 26.

The next stage of the operation is indicated in Fig. 3. The bimetal strip 24 has been heated by the current passing through the heating coil 23 and it bends towards the latch lever 12, whilst the latch lever 28 is allowed to follow this movement under the action of the pressure spring 27. When the bimetal strip has bent so far that it deflects the latch lever 12 out of engagement with the intermediates lever 7, the intermediate lever 7 is free to move upwards, but only a small distance as it becomes engaged by the projection 30 of the latch lever 28 which now has moved into the path of the turned over end 10 of the intermediate lever 7.

As a result of this limited angular deflection of the intermediate lever 7, its projection 14 has moved upwards and the contact 16 of the change-over switch 15 is free to move under the action of the spring 31 away from contact 17 and towards contact 32. Now the current no longer flows through the heating winding 23 of the bimetal strip 24, but directly over the point *b* to the heating resistance 25. Consequently, the temperature of the bimetal strip 24 drops and the strip moves to the right into its original position. It causes the latch lever 28 to move backwards against the action of the spring 27, with the result that the projection 30 releases the turned over end 10 and the intermediate lever 7 is free to return into its normal position. The restoring spring 29 lifts the intermediate lever with a quick movement, and after a certain idle stroke the intermediate lever 7 engages the main latch 13 whereby the main lever 2 is released and free to be returned by its restoring spring 34 into the "off" position. As a result of this movement, the current is interrupted at the contacts 21 and 20, since the latter contact is moved away from the fixed contact 21 by the spring 33. On its return movement, the main switch lever 2 strikes the cam 5, but is not prevented from returning into its normal position, since the cam 5 is free to be deflected out of the path of the turned over end 4 of the main switch lever 2, as indicated by dotted lines in Fig. 1. After the turned over end 4 has passed the cam 5, the latter returns into its operational position either by its own weight or by a spring (not shown). Now all the members are in their normal position, and the heating appliance is prepared to be switched on again.

By a suitable design of the cam 5 it is possible to make the arrangement such that the work to be done for deflecting the intermediate lever 7 and for tensioning the restoring spring 29 is distributed over a long way so that the force for depressing the button 1 remains small. The particular advantage of the described arrangement is to be seen in that, once the turned over end 10 of the intermediate lever 7 has engaged the projection 11 of the latch lever 12, the operation of the control mechanism cannot be impeded by inadvertent or deliberate actions. Even if the button 1 is deliberately kept in its depressed position, it cannot be prevented that the bimetal mechanism performs the operation assigned to it and that the intermediate lever 7 releases the main latch 13 after the expiration of the pre-adjusted time. Of course, current continues to flow through the heating resistance 25 until the contacts 20, 21 are parted by a release of the button 1; but the current path through the heating coil 23 of the bimetal strip 24 remains interrupted.

Usually the arrangement is made such that the main lever 2 is used simultaneously for the insertion of the bread to be toasted and for the discharge of the toasted bread. Now it may happen that the slice of bread bends due to the toasting and causes thereby jamming so that the restoring spring 34 may not be strong enough to move the main lever 2 into the "off" position. If the bread toaster is not supervised, then it may happen that the bread becomes over-toasted or even burnt since heat is still further applied although the time mechanism constituted by the bimetal strip has switched off. In order to avoid this difficulty and to ensure under all conditions that after the completion of the operation of the time mechanism also the heating current flowing through the heating resistance 25 is interrupted, either the said shunt connection between the rest contact 32 and the point *b* may be omitted, or an additional switch may be inserted into the heating circuit as shown in Figs. 4 and 5.

Between the main switch 19 and the change-over switch 15 another contact pair is provided consisting of a fixed contact 35 and a movable contact 37 carried by a contact arm 36. A tension spring 39 urges the contact arm 36 to move into the closed position. The intermediate lever 7 is provided with another arm 38 which, in the "off" position of the intermediate lever, engages the contact arm 36 and keeps the contacts 35 and 37 apart from one another. The lever arm 38 is so disposed that it releases the contact arm 36 and allows a contact between the contacts 35 and 37 already with a small movement of the intermediate lever 7 into the position where it is engaged by the latch lever 12. The arrangement is made such, that even after the bimetal strip 24 has tripped the latch lever 12 and the intermediate lever 7 is engaged by the projection 30 of the latch lever 28, the contacts 35 and 37 remain in their closed position, as shown in Fig. 5 (the position of the individual members shown in Fig. 5 corresponds to the operational position shown in Fig. 3). Only if the intermediate lever 7 is fully released and returns into its rest position, the contacts 35 and 37 are allowed to move apart whereby the whole system becomes currentless. Thus, with the arrangement shown in Figs. 4 and 5 the heating current is safely interrupted also in those cases where due to jamming or intentionally the main lever 2 is kept in its "on" position and maintains the contacts 20 and 21 in their closed position. It is also possible to associate the lever arm 38 with the main latch 13 or with any other member caused to move by or together with the intermediate lever 7.

It will be appreciated that it is not necessary to use the main lever 2 as a discharge device for the toasted bread as has been assumed with the embodiments hereinbefore described. This construction is particularly simple and convenient; but it may be preferable under certain circumstances to provide separate members for the two tasks so that the main lever can be operated first and a discharge device is brought into the locked position thereafter, or vice versa, and it is also possible to couple mechanically the two members so that both manipulations can be carried out simultaneously.

What I claim is:

1. In an electric toaster, in combination, a spring-loaded main lever adapted to support an object and tending to assume a first position for discharging the toasted object and being movable into a second position for toasting the object; a heating resistance located adjacent said main lever in said second position; a first spring-loaded latch member for arresting said main lever in said second position; an intermediate control means including a spring-loaded control lever tending to assume a first position for operating said first latch member to release said main lever, said control means being located in the path of said main lever so that said main lever moving to said second position moves said control lever into a second position; a second spring-loaded latch member for holding said control lever in said second position; a bimetal means adapted to assume in heated condition a position engaging said second latch member for releasing said control lever so that the same moves to said first position and releases said main lever; and an electric circuit connected to said heating resistance, and including a contact closed by one of said levers in said second position and a heating winding associated with said bimetal means for heating the same.

2. In an electric toaster, in combination, a spring-loaded main lever tending to assume a first position and being movable into a second position; a first spring-loaded latch member for arresting said main lever in said second position; an intermediate control means including a spring-loaded control lever tending to assume a first position for operating said first latch member to release said main lever, and also including a cam member pivotally mounted on said control lever, and a stop means limiting turning movement of said cam member in one direction, said cam member being located in the path of said main lever so that said main lever moving to said second position urges said cam member against said stop member and moves said control lever into a second position; a second spring-loaded latch member for holding said control lever in said second position; a third spring-loaded latch member for holding said control lever in a third intermediate position located between said second position and said first position; a bimetal means holding in cold condition said third spring-loaded latch member in a released position releasing said control lever and adapted to move in heated condition into another position engaging said second latch member for releasing said control lever; and an electric circuit including in series connection a heating resistance, a first contact closed by said main lever in said first position, a second contact closed by said control lever in said second position, and a heating winding associated with said bimetal means for heating the same, and also including a bridging contact in parallel with said heating winding said bridging contact tending to assume a closed position and being held in open position by said control lever in said second position whereby when said bimetal means in heated condition releases said second latch member, said control lever is held by said third latch member and said heating winding is disconnected whereupon said bimetal means cools off and releases said third latch member.

3. In an electric toaster, in combination, a spring-loaded main lever adapted to support an object and tending to assume a first position for discharging the toasted object and being movable into a second position for toasting the object; a heating resistance located adjacent said main lever in said second position; a first spring-loaded latch member for arresting said main lever in said second position; an intermediate control means including a spring loaded control lever tending to assume a first position for operating said first latch member to release said main lever, said control lever having three arms and being pivotally mounted at the end of one of said arms, and also including a cam member pivotally mounted on the free end of the second arm of said control lever, and a stop means limiting turning movement of said cam member in one direction, said cam member being located in the path of said main lever so that said main lever moving to said second position urges said cam member against said stop member and moves said control lever into a second position; a second spring-loaded latch member coperating with the free end of the third arm of said control lever for holding said control lever in said second position; a bimetal means adapted to assume in heated condition a position engaging said second latch member for releasing said control lever so that the same moves to said first position and releases said main lever; and an electric circuit connected to said heating resistance, and including a contact closed by one of said levers in said second position and a heating winding associated with said bimetal means for heating the same.

4. In an electric toaster, in combination, a spring loaded main lever tending to assume a first position and being movable into a second position; a first spring loaded latch member for arresting said main lever in said second position; an intermediate control means including a spring loaded control lever tending to assume a first position for operating said first latch member to release said main lever, said control lever having three arms and being pivotally mounted at the end of one of said arms, and also including a cam member pivotally mounted on the free end of the second arm of said control lever, and a stop means limiting turning movement of said cam member in one direction, said cam member being located in the path of said main lever so that said main lever moving to said second position urges said cam member against said stop member and moves said control lever into a second position; a second spring loaded latch member cooperating with the free end of the third arm of said control lever for holding said control lever in said second position; a third spring loaded latch member for holding said control lever in a third intermediate position located between said second position and said first position; a bimetal means holding in cold condition said third spring loaded latch member in a released position releasing said control lever and adapted to move in heated condition into another position engaging said second latch member for releasing said control lever; and an electric circuit including in series connection a heating resistance, a first contact closed by said main lever in said first position, a second contact closed by said control lever in said second position, and a heating winding associated with said bimetal means for heating the same, and also including a bridging contact in parallel with said heating winding, said bridging contact tending to assume a closed position and being held in open position by said control lever in said second position whereby when said bimetal means in heated condition releases said second latch member, said control lever is held by said third latch member and said heating winding is disconnected whereupon said bimetal means cools off and releases said third latch member.

5. In an electric toaster, in combination, spring loaded lever means tending to move into a first position for effecting discharge of a toasted body; a spring loaded preliminary latch member for holding said lever means in a second position; another spring loaded latch member for holding said lever means in a third intermediate position located between said second position and said first position; a bimetal means located intermediate said two latch members and assuming in heated condition a first position for releasing said preliminary latch member and in cold condition a second position for releasing said other latch member; and an electric circuit including in series connection a heating resistance, a contact closed by said lever means in said second position and opened in said third position, and a heating winding associated with said bimetal means, said circuit also including a bridging contact in parallel with said heating winding and tending to assume a closed position, said bridging contact being held in open position by said lever means in said second position and closing when said lever means moves to said third position whereby when said bimetal means in heated condition releases said preliminary latch member, said lever means is held by said other latch member in said third position and said heating winding is disconnected whereupon said bimetal means cools off and releases said other latch member.

6. In an electric toaster, in combination, spring loaded lever means including a control lever tending to move into a first position for effecting discharge of a toasted body; a spring loaded preliminary pivoted latch lever for holding said lever means in a second position; another spring loaded pivoted latch lever for holding said lever means in a third intermediate position located between said second position and said first position and extending substantially parallel to said preliminary latch lever, said latch levers extending transverse to said control lever; a bimetal strip extending parallel to said latch levers and having a fixed end and a free end located between said latch levers, said bimetal strip assuming in heated condition a first position for releasing said preliminary pivoted latch lever and in cold condition a second position for releasing said other pivoted latch lever; and an electric circuit including in series connection a heating resistance, a contact closed by said lever means in said second position and opened in said third position, and a heating winding associated with said bimetal strip, said circuit also including a bridging contact in parallel with said heating winding and tending to assume a closed position, said bridging contact being held in open position by said lever means in said second position and closing when said lever means moves to said third position whereby when said bimetal strip in heated condition releases said preliminary pivoted latch lever, said lever means is held by said other pivoted latch lever in said third position and said heating winding is disconnected whereupon said bimetal strip cools off and releases said other pivoted latch lever.

7. In an electric toaster, in combination, a spring loaded main lever tending to assume a first position and being movable into a second position; a first spring loaded latch member for arresting said main lever in said second position; an intermediate control means including a spring loaded control lever tending to assume a first position for operating said first latch member to release said main lever, and also including a cam member pivotally mounted on said control lever, and a stop means limiting turning movement of said cam member in one direction, said cam member being located in the path of said main lever so that said main lever moving to said second position urges said cam member against said stop member and moves said control lever into a second position; a second spring loaded latch member for holding said control lever in said second position; a third spring loaded latch member for holding said control lever in a third intermediate position located between said second position and said first position, said second and third latch members being parallel pivoted levers having opposite arresting projections cooperating with said control lever for arresting the same; a bimetal means having a fixed end and a free end, said free end being located between the free ends of said pivoted levers, said bimetal means holding in cold condition said third spring loaded latch member in a released position releasing said control lever and adapted to move in heated condition into another position engaging said second latch member for releasing said control lever; and an electric circuit including in series connection a heating resistance, a first contact closed by said main lever in said first position, a second contact closed by said control lever in said second position, and a heating winding associated with said bimetal means for heating the same, and also including a bridging contact in parallel with said heating winding, said bridging contact tending to assume a closed position and being held in open position by said control lever in said second position whereby when said bimetal means in heated condition releases said second latch member, said control lever is held by said third latch member and said heating winding is disconnected whereupon said bimetal means cools off and releases said third latch member.

8. In an electric toaster, in combination, a spring loaded main lever tending to assume a first position and being movable into a second position; a first spring loaded latch member for arresting said main lever in said second position; an intermediate control means including a spring loaded control lever tending to assume a first position for operating said first latch member to release said main lever, and also including a cam member pivotally mounted on said control lever, and a stop means limiting turning movement of said cam member in one direction, said cam member being located in the path of said main lever so that said main lever moving to said second position urges said cam member against said stop member and moves said control lever into a second position; a second spring loaded latch member for holding said control lever in said second position; a third spring loaded latch member for holding said control lever in a third intermediate position located between said second position and said first position; a bimetal means holding in cold condition said third spring loaded latch member in a released position releasing said control lever and adapted to move in heated condition into another position engaging said second latch member for releasing said control lever; and an electric circuit including in series connection a heating resistance, a first contact closed by said main lever in said first position, a second contact closed by said control lever in said second position, a third contact tending to assume a closed position and being opened by said control lever during movement of the same from said third position to said first position, and a heating winding associated with said bimetal means for heating the same, and also including a bridging contact in parallel with said heating winding said bridging contact tending to assume a closed position and being held in open position by said control lever in said second position whereby when said bimetal means in heated condition releases said second latch member, said control lever is held by said third latch member and said heating winding is disconnected whereupon said bimetal means cools off and releases said third latch member.

9. In an electric toaster, in combination, spring loaded lever means tending to move into a first position for effecting discharge of a toasted body; a spring loaded preliminary latch member for holding said lever means in a second position; another spring loaded latch member for holding said lever means in a third intermediate position located between said second position and said first position; a bimetal means located intermediate said two latch members and assuming in heated condition a first position for releasing said preliminary latch member and in cold condition a second position for releasing said other latch member; and an electric circuit including in series connection a heating resistance, a contact closed by said lever means in said second position and opened in said third position, another contact tending to assume a closed position and being opened by said lever means during movement of the same from said third position to said first position, and a heating winding associated with said bimetal means, said circuit also including a bridging contact in parallel with said heating winding and tending to assume a closed position, said bridging contact being held in open position by said lever means in said second position and closing when said lever means moves to said third position whereby when said bimetal means in heated condition releases said preliminary latch member, said lever means is held by said other latch member in said third position and said heating winding is disconnected whereupon said bimetal means cools off and releases said other latch member.

10. In an electric toaster, in combination, a heating resistance; a spring-loaded main lever adapted to support an object, said main lever tending to assume a first position for discharging a toasted object and being movable into a second position adjacent said heating resistance for toasting the object; a first spring-loaded latch member for arresting said main lever in said second position; a control means including a spring-loaded control lever tending to assume a first position for operating said first latch member to release said main lever, said control means being located in the path of movement of said main lever so that said main lever moving to said second position thereof moves said control lever into a second position; a second spring-loaded latch member for holding said control lever in said second position; a third spring-loaded latch member for holding said control lever in a third intermediate position located between said second position and said first position; a bimetal means located between said second and third latch members and assuming in heated condition a first position for releasing said second latch member and in cold condition a second position for releasing said third latch member; and an electric circuit connected to said heating resistance and including in series with said resistance a first contact closed by said main lever in said first position of the same, a second contact closed by said control lever in said second position of the same, and a heating winding for heating said bimetal means, said circuit also including a bridging contact in parallel with said heating winding, said bridging contact being closed in said third position of said control lever by said control lever and being held open by said lever in said second position of the same whereby when said bimetal means in heated condition releases said second latch member, said control lever is held by said third latch member in said third position and said heating winding is de-energized by said bridging contact whereupon said bimetal means cools off and releases said third latch member.

11. In an electric toaster, in combination, a heating resistance; a spring-loaded main lever adapted to support an object, said main lever tending to assume a first position for discharging a toasted object and being movable into a second position adjacent said heating resistance for toasting the object; a first spring-loaded latch member for arresting said main lever in said second position; a control means including a spring-loaded control lever tending to assume a first position for operating said first latch member to release said main lever, said control means being located in the path of movement of said main lever so that said main lever moving to said second position thereof moves said control lever into a second position; a second spring-loaded latch member for holding said control lever in said second position; a third spring-loaded latch member for holding said control lever in a third intermediate position located between said second position and said first position; a bimetal means located between said second and third latch members and assuming in heated condition a first position for releasing said second latch member and in cold condition a second position for releasing said third latch member; and an electric circuit connected to said heating resistance and including in series with said resistance a first contact closed by said main lever in said first position of the same, a second contact closed by said control lever in said second position of the same, a third contact tending to assume a closed position and being opened by said control lever during movement of the same from said third position to said first position, and a heating winding for heating said bimetal means, said circuit also including a bridging contact in parallel with said heating winding, said bridging contact being closed in said third position of said control lever and being held open by said control lever in said second position of the same whereby when said bimetal means in heated condition releases said second latch member, said control lever is held by said third latch member in said third position and said heating winding is de-energized by said bridging contact whereupon said bimetal means cools off and releases said third latch member.

References Cited in the file of this patent

UNITED STATES PATENTS

| | | |
|---|---|---|
| 2,180,232 | Geier | Nov. 14, 1939 |
| 2,266,024 | Gomersall | Dec. 16, 1941 |
| 2,302,117 | Gomersall | Nov. 17, 1942 |
| 2,558,199 | Scharf | June 26, 1951 |
| 2,693,142 | Ireland | Nov. 2, 1954 |